Figure 1:
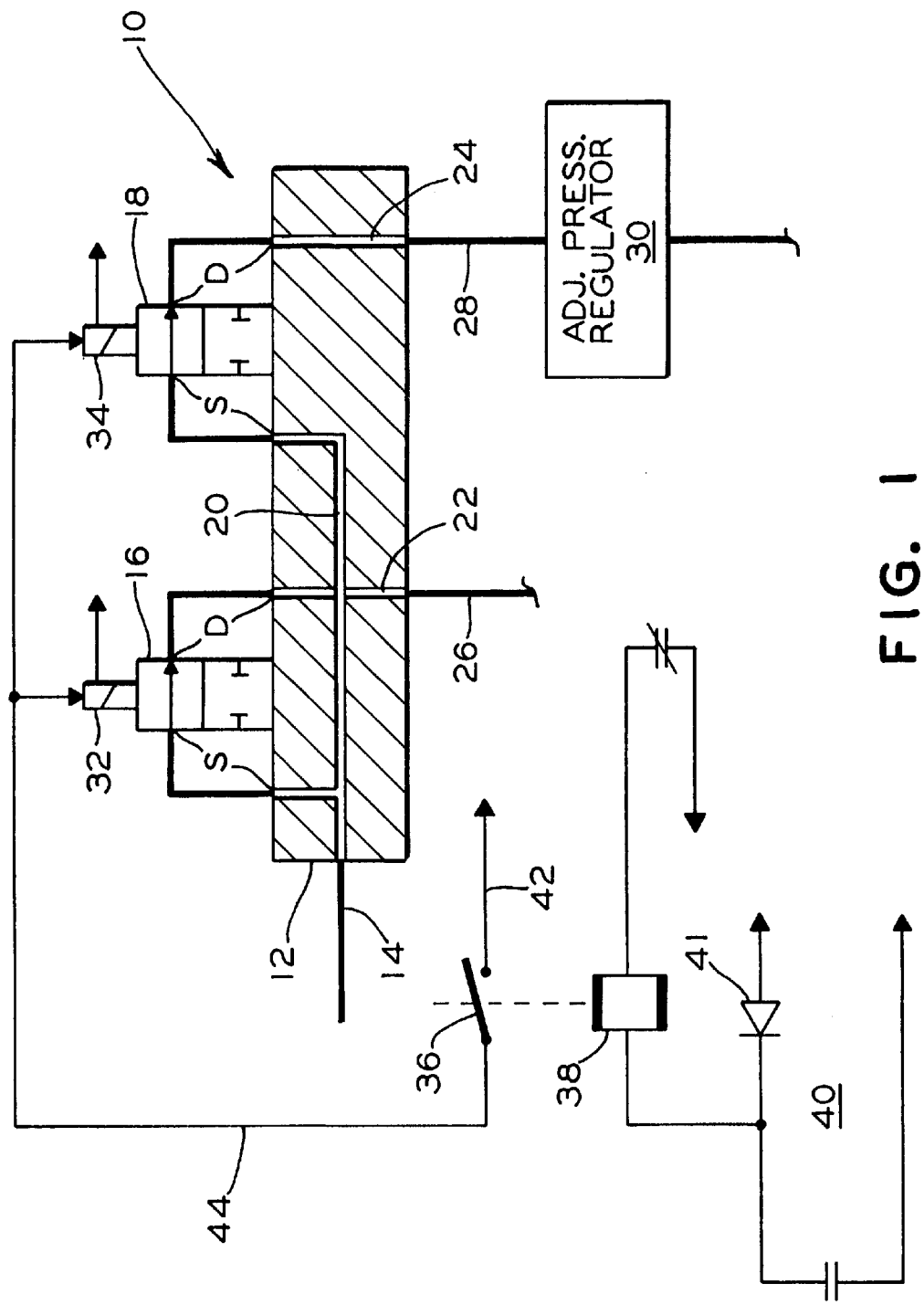

United States Patent [19]
Dimsa et al.

[11] Patent Number: 5,934,764
[45] Date of Patent: Aug. 10, 1999

[54] METHOD FOR LIMITING BRAKE CYLINDER PRESSURE ON LOCOMOTIVES EQUIPPED WITH DISTRIBUTIVE POWER AND ELECTRONIC BRAKE SYSTEMS

[75] Inventors: Robert D. Dimsa, Elizabeth; Vincent Ferri; Paul J. Kettle, Jr., both of Pittsburgh; Robert J. Jenets, North Huntingdon, all of Pa.

[73] Assignee: Westinghouse Air Brake Company, Wilmerding, Pa.

[21] Appl. No.: 08/906,504

[22] Filed: Aug. 5, 1997

[51] Int. Cl.⁶ ..................................................... B60T 13/74
[52] U.S. Cl. .................................. 303/3; 303/40; 303/74
[58] Field of Search .................................. 303/3, 15, 26, 303/29, 40, 41, 42, 32, 33, 35, 62, 67, 74

[56] References Cited

U.S. PATENT DOCUMENTS 5,503,467 4/1996 Gaughan ....................................... 303/3
5,564,794 10/1996 Hart ............................................. 303/3

*Primary Examiner*—Robert J. Oberleitner
*Assistant Examiner*—Mariano Sy
*Attorney, Agent, or Firm*—James Ray & Associates

[57] ABSTRACT

Method and apparatus for limiting brake cylinder pressure in emergency braking of a locomotive consist connected to a train of railway cars. The apparatus includes a manifold device connected to a reservoir of pressurized fluid for operating pneumatic brakes of the locomotive consist. A first magnet valve is connected to the manifold device for supplying fluid pressure from such device to a brake actuating pipe when an operating coil of the first magnet valve is energized. A second magnet valve having an operating coil is connected to the manifold device for supplying fluid pressure from the reservoir to an adjustable pressure regulator connecting an independent application and release pipe to the manifold device. A relay is connected to receive an emergency brake signal and conduct emergency power to the operating coils of the first and second valves whereby fluid pressure is supplied to the brake actuating pipe and to the adjustable pressure regulator from the manifold device. The adjustable pressure regulator provides the independent and release pipe with a fluid pressure preset to a predetermined value by the adjustable pressure regulator.

13 Claims, 2 Drawing Sheets

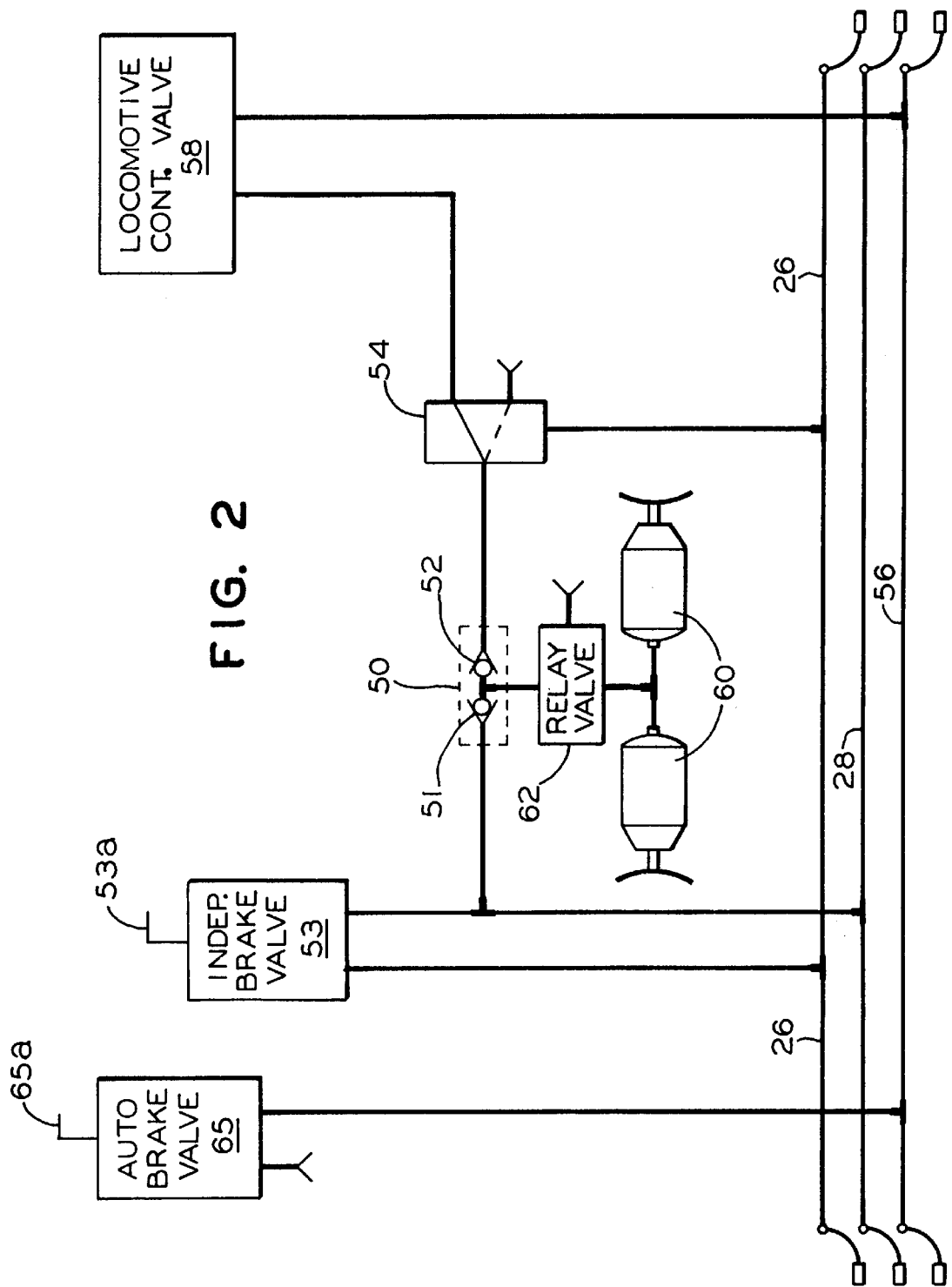

METHOD FOR LIMITING BRAKE CYLINDER PRESSURE ON LOCOMOTIVES EQUIPPED WITH DISTRIBUTIVE POWER AND ELECTRONIC BRAKE SYSTEMS

BACKGROUND OF THE INVENTION

The present invention relates generally to emergency control of brakes on locomotive consists (i.e. two or more interconnected locomotives) connected to a train of railroad cars.

A typical "train consist" includes at least one locomotive connected to one or more rail cars and a plurality of "trainlines" extending between the respective cars and between the locomotive and the cars. Trainlines comprise both pneumatic and electrical lines that interconnect air brakes and electrical devices respectively located on and/or in each of the cars. In the locomotive, the pneumatic trainline includes a brake actuating pipe, a main equalizing reservoir(MER) pipe and an independent application and release (IAR) pipe. Within the "locomotive consist", each of the MER, brake actuating and IAR pipes respectively interconnect with the MER, actuating and IAR pipes of the other locomotive(s). These are the pipes that serve to supply pressurized air to pneumatic brakes situated on each of the locomotives of the consist.

From a lead locomotive to the first car of the train and from the first car to the last car of the train, the pneumatic trainline includes a brake pipe having a pressure that mimics the pressure within an equalization tank and reservoir located in the lead locomotive. The brake pipe itself includes a series of pipe lengths secured to the underside of the cars, the lengths being connected together via flexible coupling hoses situated between the cars.

Sometimes referred to in the singular as a "trainline" or "trainline cable", electrical trainlines, i.e., wire conductors, include a power line, a return (ground) line and various control and other electrical lines contained within a protective sheath or conduit.

A typical locomotive consist uses an electronic brake control system such as the WABCO EPIC® equipment, as described in U.S. Pat. Nos. 5,192,118 and 5,222,788. The disclosures of these patents are incorporated herein by reference. In using the EPIC® equipment in a locomotive consist, one of the locomotives of the consist is equipped as the control locomotive, which locomotive remotely operates the brakes of slave locomotives of the consist. In addition to EPIC® and other electronic brake control systems, a locomotive consist may be provided with distributed electrical power control equipment which uses radio transmitting and receiving equipment to control slave locomotive(s) located near or at the center of the overall length of the train or to locomotive(s) at the end of the train remote from the controlling locomotive.

The cab of a typical locomotive includes an independent brake valve handle, an automatic brake valve handle, and an electronic cab control unit. The cab control unit has a CPU board and an input/output (I/O) card which links the handles to a cab CPU board. Through use of the independent brake handle, a train operator may apply and release the brakes on the locomotive consist. Through the automatic brake handle, the train operator may apply and release the brakes not only on each locomotive but also the brakes on each rail car, the handles being effective to control pressure in the brake pipe. The reduction or increase of pressure within the brake pipe, and thus the amount of braking power exerted by the train brakes, generally corresponds to the position of the automatic brake handle.

A cab control unit supplies to a cab brake control unit signals representing the positions of the automatic and independent brake handles. The automatic brake handle may be moved to and between any of the positions described generally as follows. From a release position, at one extreme, in which brake pipe pressure is maximum and the brakes are completely released to an emergency position, at another extreme, in which brake pipe pressure is at an approaching zero and the brakes are fully applied, the brake pipe may assume any pressure level in between. When the automatic brake handle is moved to the release position, the brake equipment increases pressure within the equalization reservoir and in the brake pipe and correspondingly reduces pressure within the brake cylinders so as to release completely the train brakes. In the minimum service position, the brake equipment reduces pressure slightly in the equalization reservoir and thus in the brake pipe so as to provide a minimum application of the brakes rather than having no application with the full release position. In the full service position, the brake equipment further reduces pressure within the equalization reservoir and thus the brake pipe and correspondingly increases pressure within the brake cylinders so as to apply fully the train brakes.

In a continuous service position, the brake equipment reduces the equalization reservoir pressure to zero at a preset service rate of reduction. When the automatic brake handle is moved back into a service zone situated between the minimum and full service positions, the brake equipment generally holds pressure within the brake pipe at the currently existing pressure. In the emergency position, the brake equipment exhausts brake pipe pressure to atmosphere through emergency magnet valve(s) at an emergency rate so as to apply quickly and fully the train brakes.

Likewise, the independent brake handle may be moved between and placed within any of two positions. When the independent brake handle is moved to the release position, the brake equipment reduces pressure within the IAR pipe and correspondingly reduces pressure in the brake cylinders of the locomotive so as to release completely the locomotive brakes. Similarly, when the independent brake handle is moved to the apply position, the brake equipment increases pressure within the IAR pipe and correspondingly increases pressure in the brake cylinders of the locomotive so as to apply fully the locomotive brakes. Pressure within the IAR pipe and the locomotive brake cylinders reduces and increases in relation to the position of the independent brake handle.

SUMMARY OF THE INVENTION

Briefly, in emergency application of locomotive brakes in a locomotive consist, it is desirable that the locomotive(s) at the center or remote end of the train do not brake excessively relative to the cars and locomotives located ahead of the center or remote end locomotive(s) to prevent excessive strain or pull on couplers that mechanically connect the cars together. Excessive strain or pull can break the couplers, which means that broken couplers must be replaced in the field before the cars with the broken couplers can be reconnected and movement (travel) of the train resumed. Spare couplers are carried on a train for replacement purposes. A spare coupler must, however, be carried by hand from the location of coupler storage to the location of the broken coupler. Each coupler weighs about seventy-five pounds and long freight trains can be as much as two or more miles in length such that the task of replacing couplers can be quite onerous.

The present invention is directed to a means and method for limiting brake cylinder pressure on locomotive consists equipped with electronic brake control and distributed power systems when the electronic brake control system suffers a loss of electrical power and the distributed power system initiates an emergency brake application in the locomotive suffering the loss of power. This is accomplished by a manifold type of structure connected to a main reservoir pipe in the locomotive and to two magnet valves that supply, respectively, fluid pressure from the reservoir and manifold to a brake actuating pipe and to an independent brake application and release pipe. The pressure supplied to the actuating pipe is substantially that of the main reservoir, while that of the independent release pipe is that provided by an adjustable pressure regulator connected between the manifold and independent release pipe, and set at a prescribed output pressure. The logic of actuating and independent application and release pipe pressures operating in a locomotive, as explained hereinafter, insures that brake cylinder pressure on the affected locomotive, or another locomotive or locomotives properly connected to such a locomotive, will be regulated to a pressure value lower than that normally developed during an emergency application of the locomotive brakes.

It is therefore an objective of the invention to lower brake cylinder pressure in locomotive consists connected to a train of cars in emergency situations to prevent undue strain on couplers connecting the cars of the train together.

It is another objective of the invention to provide a locomotive in a locomotive consist equipped with electronic brake and distributed power control equipment with means to control brake cylinder pressure when the electronic brake control equipment suffers a loss of electrical power in emergency conditions.

It is a further objective of the invention to insure that locomotives in the center of or at the remote end of a long train of railway cars apply their brakes under emergency conditions in a manner that is less severe than the brake application of the cars.

THE DRAWINGS

The advantages and objectives of the invention will be better understood from consideration of the following detail description and the accompanying drawings in which:

FIG. 1 is a schematic representation of a device for limiting brake cylinder pressure on a locomotive when electronic brake control equipment on the locomotive experiences a loss of electrical power and emergency braking is ordered, and FIG. 2 is a schematic diagram of a well-known fluidic circuit for actuating and releasing locomotive brakes under the control of automatic and independent brake valve handles.

PREFERRED EMBODIMENT

Referring now to FIG. 1 of the drawings, a device, generally designated 10, is shown somewhat diagrammatically for controlling the level of brake cylinder pressure on locomotives when electronic brake equipment (not shown) on the locomotive suffers a loss of power. More particularly, a manifold or other suitable structure 12 is shown connected to a pipe 14 containing pressurized fluid from a main reservoir (not shown) in the locomotive. Two magnet valves 16 and 18 are shown connected to the manifold 12 at two spaced apart locations. Manifold 12 contains a passageway 20 that extends from reservoir pipe connection 14 to two locations "S" associated, respectively, with the two magnet valves 16 and 18. In addition, two passages 22 and 24 are provided in the manifold adjacent the S locations, passage 22 extending from a location "D" on the manifold through the manifold to a pipe 26. Pipe 26 is a brake actuating pipe presently to be described.

Similarly, passage 24 extends from a second location D through the manifold to a pipe 28, which is an independent brake application and release pipe, the purpose of which will also be explained.

As seen further in FIG. 1, an adjustable pressure regulator 30 is serially connected in pipe 28.

Locations S and D on manifold 12 are entry ports, respectively, into passages 22 and 24 from valves 16 and 18. These ports are in closed and opened positions depending upon the positions of ports S and D provided in movable valve bodies (not shown) located within the housings of respective valves 16 and 18. In FIG. 1 the valves are in a de-energized state such that no air is allowed to flow from valve ports S and D.

Valves 16 and 18 are operated, i.e., energized, by coils 32 and 34 of the respective valves receiving an appropriate voltage in a manner presently to be explained.

As seen further in FIG. 1, the coils 32 and 34 of the respective valves 16 and 18 are electrically connected to normally open contacts 36 operable by a relay coil 38. Relay coil 38 is connected in the circuit 40 of an emergency magnet valve (not otherwise shown), which valve receives an emergency signal from the distributed power control system (not shown) of the locomotive. This signal energizes coil 38 to close contacts 36.

Circuit 40 contains a series diode 41 that prevents actuation of coil 38 during normal braking and thus prevents limiting brake cylinder pressure for such normal braking. The purpose of the invention is to limit or lower brake cylinder pressure during emergency braking for the reasons discussed earlier.

Relay contacts 36 are connected in series between an electrical trainline wire 42 and coils 32 and 34 of valves 16 and 18. Train wire 42 supplies DC power (74 volts, for example) to contacts 36 when the electronic brake control system in the affected locomotive incurs a power fail condition, i.e., the electronic brake control system has internal relays that assume a power fail status and pass the 74 VDC power through normally closed contacts of such internal relays. When contacts 36 are closed by energizing relay coil 38, the 74 VDC power is conducted to coils 32 and 34 of valves 16 and 18 over conductor 44 to align valve ports S and D with manifold ports S and D. Pipe 26 is now pressurized with the pressure in reservoir pipe 14, and pressure regulator 30 receives reservoir pressure. The pressure regulator pressurizes pipe 28 at a pressure value lower than that in pipe 26 by appropriate adjustment of the regulator 30.

The pressure values in pipes 26 and 28 can now be used to insure lower than normal brake cylinder pressure in the locomotive. This is accomplished by action of a double check valve 50 connected to receive, respectively, actuating and independent application and release pipe pressures, as seen in FIG. 2 of the drawings. The left hand valve of the double check valve 50 is labeled 51 while the right hand valve is designated by numeral 52.

As seen further in FIG. 2, an independent brake valve 53 (with a handle 53a) is connected to the actuating and independent pipes 26 and 28, with the independent pipe 28 being directly connected to the left check valve 51 of double valve 50 while actuating pipe 26 is connected to the right hand valve 52 of valve 50 through a release valve 54. A continuous brake pipe 56 for the locomotives and train cars is also shown in FIG. 2, which pipe is connected to release valve 54 via a control air valve 58. Valve 58 applies control air pressure to check valve 52 in response to a pressure reduction in brake pipe 56.

Pipes 26, 28 and 56 in FIG. 2 extend to locomotives of a consist, and are pressurized by main and equalizing pressure reservoirs in a well known manner. Pipe 56, in addition, extends to all of the cars of a train for control of the car brakes as well as the locomotive brakes.

Double check valve 50 is connected to brake cylinders and associated brakes 60 by a relay valve 62, all of which is schematically depicted in FIG. 2. Valve 62 is a pneumatic relay valve that supplies a high volume of air in response to a control pressure from double check valve 50. Numeral 60 is employed to denote schematically both brake cylinder and associated brake shoes.

In normal operation of the locomotive containing device 10 of the invention (FIG. 1), pipes 26, 28 and 56 are pressurized by reservoirs of air pressure located in the controlling and controlled locomotive. As such, air pressure is supplied to check valve 52 via pipe 26 and release valve 54. Brake pipe pressure 56 is supplied to control valve 58 and through valve 58 to release valve 54, hence to check valve 52.

The operator/engineer in the lead locomotive has charge of locomotive brakes 60 via brake handle 53a, and through radio signals, to slave locomotives. In a brake release position, air in pipe 56 maintains locomotive and car brakes in a released state, i.e., in a state that maintains brake cylinders and brake shoes 60 in a de-energized non-braking state. If the operator wishes to brake the entire train he moves a handle 65a of an automatic brake valve 65 to exhaust air from pipe 56 which permits brakes to be actuated by pressure supplied to car brake cylinders locally from local reservoirs and to locomotive brakes 60 from locomotive reservoirs via relay valve 62 receiving control air from release and control valves 54 and 58. The air pressure on valve 52 of double valve 50 is now greater than that on valve 51 such that valve 52 is open and valve 51 is closed. If the operator wishes to activate only locomotive brakes, he moves only the independent brake valve handle 53a to a brake valve application position which supplies air pressure from independent and release pipe 28 to check valve 51. While valve 52 is supplied with air at a pressure greater than that at valve 51, locomotive brakes 60 are applied by way of valve 52, as the greater pressure opens valve 52 and closes valve 51. When the value of air pressure on check valve 52 falls below that on check valve 51, the valves move to the right to close 52 and open 51. In this manner, the independent pipe pressure 28 controls the application of pressure to locomotive brakes 60.

Referring again to FIG. 1 of the drawings, when magnet valves 16 and 18 of device 10 receive the emergency voltage from trainline 42, the pressure in pipe 56 is rapidly exhausted to permit rapid brake application. Pressure is supplied to pipe 26 through operation of coil 32 of magnet valve 16. This increases pressure in pipe 26 which is transmitted to release valve 54. Valve 54 then exhausts the control air from control valve 58 to check valve 52. The pressure supplied to check valve 52 thus falls below the low pressure value provided by pressure regulator 30 (in FIG. 1) and supplied to the independent and release pipe 28. This pressure appears at check valve 51 and is effective to open valve 51 and close valve 52 when the pressure on valve 52 falls below that of valve 51, as supplied by regulator 30. The low pressure value on valve 51 now operates the brakes of the controlling and controlled locomotives in moderation so that the couplers that connect the cars in the train together will not undergo excessive strain by emergency brake application of locomotives located in the center or at the remote end of the train. In contrast thereto, if the high control pressure developed by control valve 58 through release valve 54 to brakes 60 via check valve 52 were allowed to continue, locomotive braking would tend to be excessive.

While a presently preferred embodiment for carrying out the instant invention has been set forth in detail in accordance with the Patent Act; those persons skilled in the braking art to which this invention pertains will recognize various alternative ways of practicing the invention without departing from the spirit and scope of the claims appended hereto.

We claim:

1. Apparatus for limiting brake cylinder pressure in emergency braking of a locomotive consist connected to a train of railway cars, said apparatus comprising:

a manifold device connected to a reservoir of pressurized fluid for operating pneumatic brakes of such locomotive consist, a first magnet valve connected to said manifold device for supplying fluid pressure from said device to a brake actuating pipe when an operating coil of said first magnet valve is energized, a second magnet valve connected to said manifold device for supplying fluid pressure from said reservoir to a pressure regulator when an operating coil of said second magnet valve is energized, said pressure regulator connecting an independent application and release pipe to said manifold device, and a relay connected to receive an emergency brake signal and conduct emergency power to operating coils of said first and second valves whereby fluid pressure is supplied to such brake actuating pipe and to said pressure regulator from said manifold device, said pressure regulator providing said independent application and release pipe with a fluid pressure preset to a predetermined value by said pressure regulator.

2. The apparatus of claim 1, wherein said pressure regulator is adjustable.

3. The apparatus of claim 1, wherein locomotives of said consist are electrically connected together by a trainline, said trainline being effective to supply said emergency electrical power to electrical contacts of said relay.

4. The apparatus of claim 1, in which such locomotive consist includes at least one locomotive located at a forward end of such train and at least one locomotive being at a location remote from such one locomotive, with one of said locomotives being equipped to remotely and electronically control brakes of such other locomotive by signals transmitted from such controlling locomotive to such other locomotive, and to provide such remotely controlled locomotive with limiting of brake cylinder pressure upon failure of power to such electronically controlled brakes on such remote locomotive.

5. The apparatus of claim 4, wherein said signals transmitted from such controlling locomotive to such other locomotive are transmitted by radio communication.

6. The apparatus of claim 1, wherein a release valve is connected between such brake actuating pipe and a control valve for receiving air pressure from a brake pipe of such locomotive consist, with such release valve and independent and release pipe being connected respectively to opposed check valves of a double check valve arrangement connected to supply air to brake cylinders of at least one of such locomotives of such consist.

7. Apparatus for limiting brake cylinder pressure in emergency braking of a locomotive consist that includes at least one locomotive located at a forward end of a train and at least one locomotive being at a location remote from such one locomotive, with one of such locomotives being equipped to remotely and electronically control brakes of such other locomotive by signals transmitted from such controlling locomotive to such other locomotive, said apparatus comprising:

a manifold device connected to a reservoir of pressurized fluid for operating pneumatic brakes of such locomotive consist, a first magnet valve connected to said manifold device for supplying fluid pressure from said device to a brake actuating pipe when an operating coil of such first magnet valve is energized, a second magnet valve connected to said manifold device for supplying fluid pressure from such reservoir to a pressure regulator when an operating coil of said second magnet valve is energized, said pressure regulator connecting an independent application and release pipe to said manifold device, and a relay connected to receive an emergency brake signal and conduct emergency power to operating coils of said first and second valves whereby fluid pressure is supplied to such brake actuating pipe and to said pressure regulator from said manifold device, said pressure regulator providing the independent application and release pipe with a fluid pressure preset to a predetermined value by said pressure regulator.

8. The apparatus of claim 7, wherein said pressure regulator is adjustable.

9. A method of limiting emergency brake cylinder pressure in a locomotive equipped with distributed power control and electronically initiated brake control systems, the method comprising:

using a manifold device to pressurize a brake actuating pipe and a pressure regulator from a main reservoir of pressurized fluid via operation of magnet valves, using a relay connected in electrical series between a portion of said electronically initiated brake control system and respective operating coils of said magnet valves for operating said valves when said relay receives an emergency signal from said distributed power control system, and using said pressure regulator to pressurize an independent application and release pipe connected to said regulator until said independent application and release pipe is pressurized to a preset pressure value provided by said regulator.

10. The method of claim 9, including using two check valves of a double check valve arrangement to receive respectively independent application and release pipe pressure and pressure from a release valve connected between a brake actuating pipe and a control valve connected to receive air pressure from a brake pipe of the locomotive.

11. The method of claim 10, including using said check valve connected to said release valve to supply control air pressure to brake cylinders of said locomotive while the other check valve receives air pressure from said independent application and release pipe at a level established by said pressure regulator.

12. The method of claim 11, including adjusting a level of air pressure provided by said regulator to a value lower than that provided by said release valve receiving normal operating pressure from the actuating pipe and control valve.

13. The method of claim 10, including using said release valve to lower pressure on said check valve connected to said release valve to a level below that on said check valve connected to said independent application and release pipe.

* * * * *